United States Patent
Mills et al.

[19]

[11] Patent Number: 6,056,840
[45] Date of Patent: May 2, 2000

[54] METHOD AND APPARATUS FOR HEAVY CORRUGATED PLASTIC CONSTRUCTION

[75] Inventors: Michael W. Mills, Franklin; Richard Carter, Plymouth, both of N.H.

[73] Assignee: Mills Industries, Inc., Laconia, N.H.

[21] Appl. No.: 09/049,721

[22] Filed: Mar. 27, 1998

[51] Int. Cl.[7] .................................................. B29C 53/06
[52] U.S. Cl. ...................... 156/217; 156/227; 156/309.9; 493/141; 493/162; 220/670
[58] Field of Search ..................... 156/211, 217, 156/227, 257, 258, 309.6, 309.9, 510; 493/59, 133, 141, 160, 162, 341, 355, 356, 399; 220/670; 229/930, 939

[56] References Cited

U.S. PATENT DOCUMENTS

| | | |
|---|---|---|
| 1,778,164 | 10/1930 | Platter et al. . |
| 2,160,221 | 5/1939 | Masters et al. ........................... 229/14 |
| 3,360,420 | 12/1967 | Paul et al. ................................ 156/492 |
| 3,980,005 | 9/1976 | Buonaiuto ................................ 93/36.01 |
| 4,090,903 | 5/1978 | Matsui ..................................... 156/211 |
| 4,731,047 | 3/1988 | Lobb ......................................... 493/10 |
| 5,466,211 | 11/1995 | Komarek et al. ........................ 493/355 |
| 5,501,758 | 3/1996 | Nitardy ................................... 156/227 |

FOREIGN PATENT DOCUMENTS

| | | |
|---|---|---|
| 49-44943 | 11/1974 | Japan . |
| 50-2182 | 1/1975 | Japan . |

Primary Examiner—Michael W. Ball
Assistant Examiner—Michael A Tolin
Attorney, Agent, or Firm—Lahive & Cockfield, LLP

[57] ABSTRACT

A heated blade arrangement in a press is brought down on a plastic work piece of heavy corrugated plastic held on the bed of the press to compress the work piece along fold lines. The work piece may then be folded up to form a box-like structure. The arrangement includes heaters to heat surfaces of the work piece to be pressed together for adhesion. A frame is provided, about which the box-like structure may be formed.

3 Claims, 6 Drawing Sheets

METHOD AND APPARATUS FOR HEAVY CORRUGATED PLASTIC CONSTRUCTION

The invention relates to heavy corrugated plastic and particularly to a method and apparatus for constructing a walled receptacle from a heavy corrugated plastic sheet.

BACKGROUND OF THE INVENTION

Heavy corrugated plastic is a sturdy, durable material that is useful for making many products. Among those products are containers, trays, boxes and other walled receptacles.

Such structures are usually made by cutting an appropriate shape from a heavy corrugated plastic sheet, and then bending portions of the sheet to form walls. The sheets of material are prepared for bending by having applied to them, under some pressure, dies that compress the material enough to allow it to be bent. Corners are made by connecting overlapping surfaces of the bent portions with adhesive or ultrasonic welding.

This procedure requires setting up die rules fixed in a wood platform, since the pressure required means that the die rules must be securely fixed in a press. Even so, the pressure from fixed die rules is usually not enough to adequately score for bending corrugated plastic of more than 5 millimeters of thickness. The bending process does not eliminate the memory of the thermoplastic, as it wants to return back to a flat sheet. The additional step of securing corners by adhesives or ultrasonic welding is time-consuming and expensive. Furthermore, the boxes so constructed have bends that are so difficult to maintain in that the folded walls tend to bow out so that reinforcing steel wires are needed to maintain the shape of the receptacle.

It is an object of this invention to provide an improved method and apparatus for forming walled receptacles from heavy corrugated plastic sheets.

SUMMARY OF THE INVENTION

The method of the invention includes the steps of designating fold lines on a heavy corrugated plastic sheet, applying heated blades to melt and compress the heavy corrugated plastic sheet along the fold lines, simultaneously heating the corner edge surfaces of the heavy corrugated plastic sheet that will join, seal and form the corners during construction of the walled receptacle to the point of tackiness, and then bending the sheet along the fold lines and contacting the heated corner edge surfaces under pressure so that they adhere after cooling.

Preferably the method includes first cutting slots in the sheet to a fold line, whereby portions of the sheet adjacent the slots may be bent. The heated blades should be heated to a temperature in the range of approximately 390° F. to 450° F., more preferably in the range of approximately 395° F. to 450° F., and most preferably approximately 430° F. Lower temperature can be used in the process at the expense of a longer scoring time along the fold lines. Temperatures greater than 450° F. can be used, but the release coating on the blades to facilitate release from the plastic will have a decreased life.

The apparatus of the invention is a press that includes a bed section with a surface for holding a heavy corrugated plastic sheet and a head section having an arrangement of heatable blades arranged in a plane, and heating means for heating the blades, the bed section and head section being arranged in an opposing relationship, and pressing means for pressing the heatable blades in the head section on the heavy corrugated plastic sheet on the bed section, whereby the blades melt and compress the sheet along fold lines to permit formation of the sheet into a walled receptacle after removal from the press.

Preferably, the press has a first heated surface means for heating a corner edge surface to the point of tackiness, and a second heated surface means for heating a second corner edge surface of the sheet to the point of tackiness, in which the second surface may be brought into contact with the first surface after removal from the press. The apparatus may further include a frame for forming the walled receptacle, the frame including means for maintaining the first and second heated surfaces in contact under pressure.

DESCRIPTION OF THE DRAWINGS

Other objects, features and advantages of the invention will be set forth in, or will be seen as inherent in, the following description of a preferred embodiment of the invention, including the drawings thereof, in which.

BRIEF DESCRIPTION OF A PREFERRED EMBODIMENT

Figure 1A:
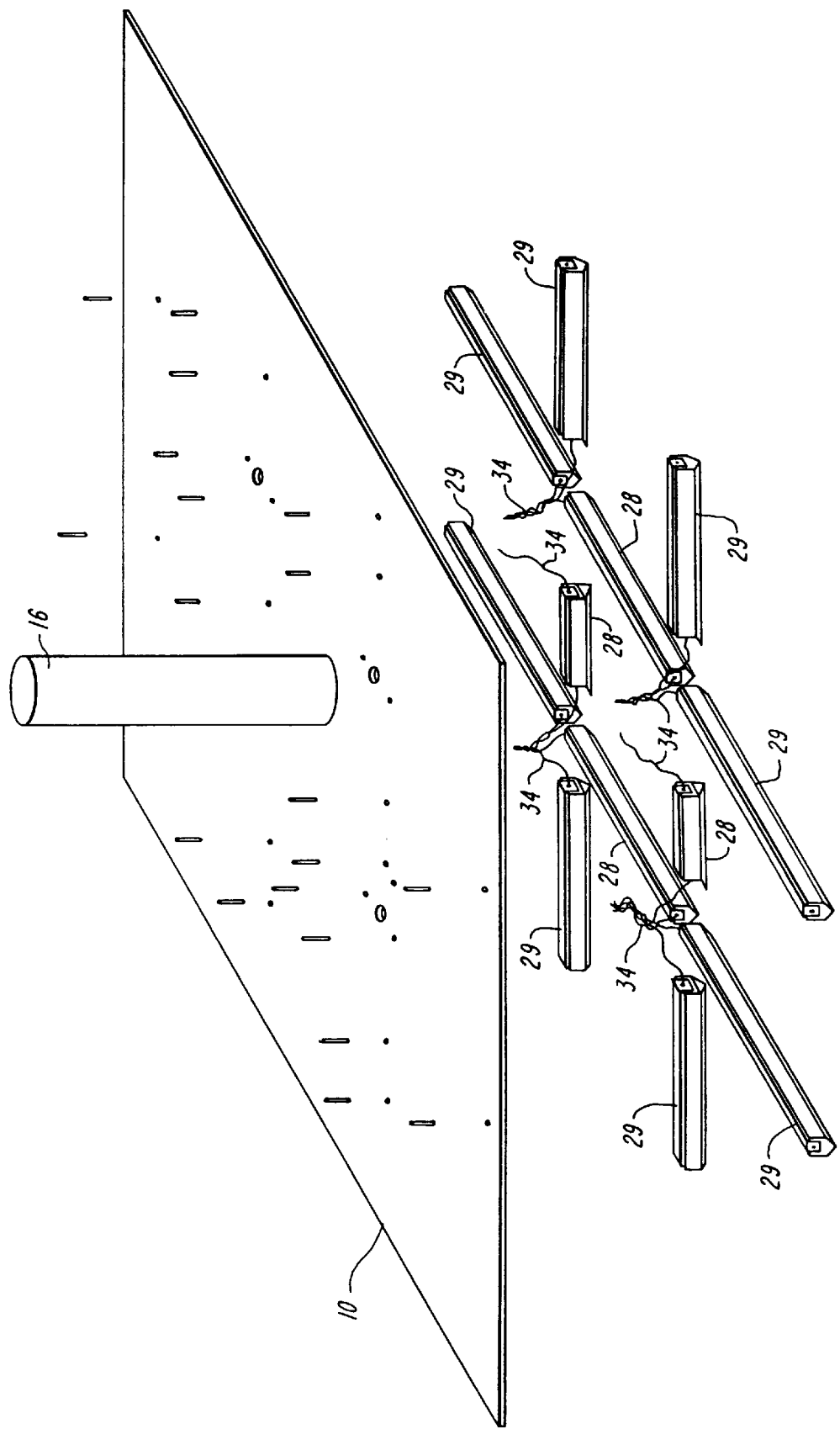
FIG. 1A is a perspective view of the head of a press.
Figure 1B:
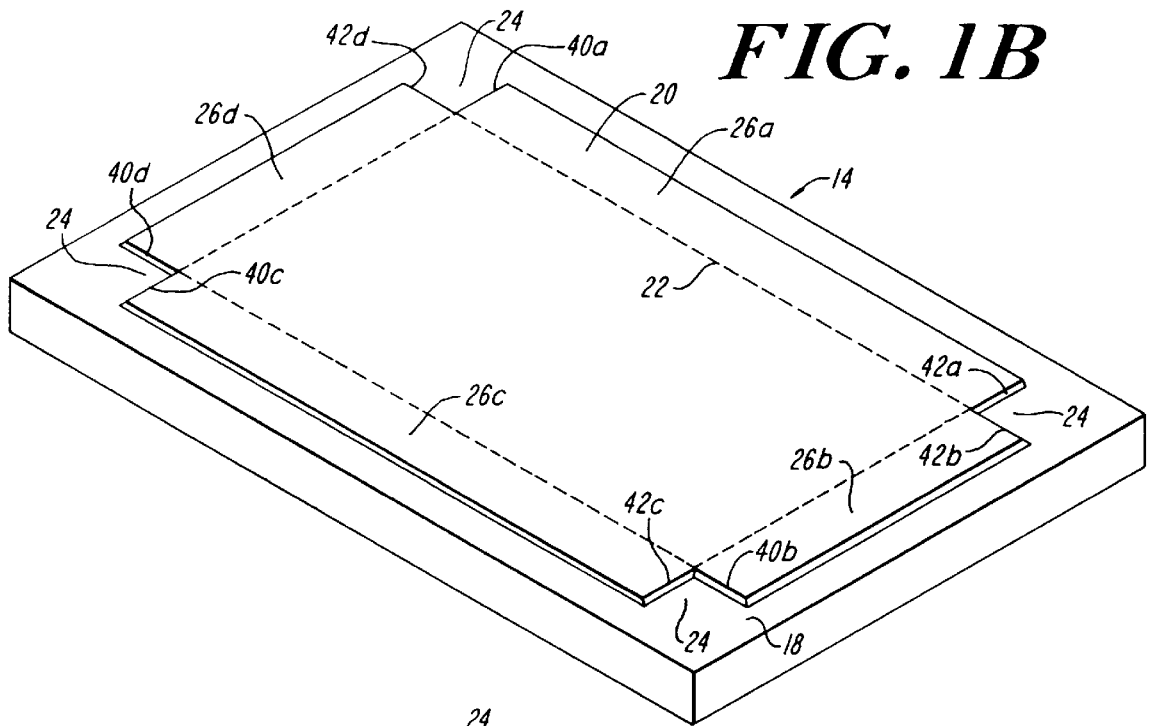
FIG. 1B is a perspective view of the top of the bed of a press.

FIGS. 1A and 1B show the head 10 of a press. and the bed 14 of a press 12, respectively, in somewhat diagrammatic form. The head 10 of the press. moves up and down in relation to the bed 14 under the control of a piston 16, or similarly functioning mechanical or hydraulic device such as are well known to those skilled in the art, to bring the head of the press to bear on the bed of the press.

As shown in FIG. 1B, the press bed 14 has a surface 18 for holding a workpiece 20 to be converted into a walled receptacle. The workpiece 20 is a heavy corrugated plastic sheet, typically polyethylene or polypropylene. The thickness of the workpiece 20 depends on the application, but is typically in the range of 6 mm to 10 mm or more.

The walled receptacle into which the workpiece, or heavy corrugated plastic sheet, 20 is converted results from bending the sheet 20 along fold lines 22 designated by dotted lines on the sheet 20 in FIG. 1B.

The sheet 20 is precut with square corner cuts 24 extending from the perimeter of the sheet to the approximate vicinity of the fold lines 22 at each of the four corners of the sheet 20. The corner cuts 24 are die cut into the sheet 20 to form a left edge 40*a, b, c,* and *d* and a right edge 42*a, b, c,* and *d* on each of the wall portions 26*a, b, c* and *d* so that the wall portions of the sheet 20 can be easily bent 90° into an upright position, and join at the edges to form a sealed receptacle. The corner cuts can also be angled to create a receptacle with drafts or tapered walls.

Figure 1C:
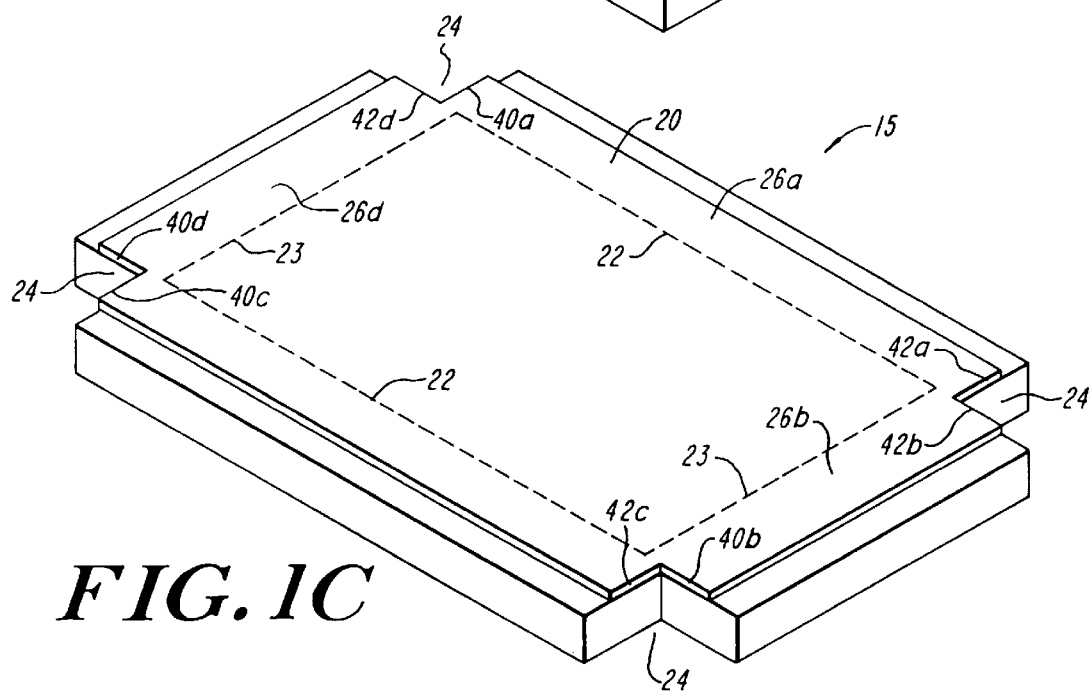
FIG. 1C is a perspective view of the top of an alternate embodiment of a bed of a press.

In an alternative practice of the invention bed 15, as shown in FIG. 1C, has 4 cutaways at each edge of the bed in order to accommodate the corner cuts 24. The cutaways at the edge of the bed are in line with the corner cuts 24 made in the thermoplastic sheet.

The press head 10 has mounted on it an arrangement of heatable blades 28, 29. The blades 28, 29 are long metal strips 30 (see FIG. 2), preferably fabricated from aluminum, through which extend electric heating elements 32 ending in electric wires 34 for connection to a source of electric power (not shown). The heating elements 32 are preferably individually controlled, having a separate heater and thermocouple wire to provide feedback for each blade 28, 29. The heaters are controlled to maintain the temperature of the blades 28, 29 at a set point by adjusting the power. The temperature of the heated blades 28, 29 is controlled to maintain a temperature in the range of approximately 390° F. to 450° F., more preferably in the range of approximately 395° F. to 450° F., and most preferably approximately 430° F. The heating elements 32 are rated for a watt density of 20 to 40 watts per square inch. The heatable blades 28, 29 have pointed edges 36 for contacting the heavy corrugated plastic sheet 20 on the press bed 14 or 15 below. Heated blades 29, at the intersection of blades 28, extend lower in the direction of the bed 14 or 15 than heated blades 28 and thus heated blades 29 contact the workpiece 20 before heated blades 28. Heated blades 28, 29 are mounted on press head 10 in a bi-planar arrangement so that when blades 28 are lowered to score the plastic at the folds 22 without cutting through the material, heated blades 29 extend fully through the material at the edge of the corner cuts 24. In other words blades 28 are mounted on presser head 10 in a first planar arrangement and heatable blades 29 are mounted on presser head 10 in a second plane that is parallel to the first arrangement but extending further from presser head 10 than blades 28. When utilizing the bed 15 in practicing the invention, blades 29 are preferably located in a lower position from blades 28 than when bed 14 is utilized. This further extension of blades 29 permits the blades to pass through the cutaway corners of bed 15. The edges 36 of the blades 28, 29 are coated with an appropriate non-stick coating, to avoid a build up of molten plastic on the blades 28, 29. The coating is preferably perfluoroalkoxy which is blended with fluorinated ethelyne-propylene. Fluorinated ethelyne-propylene alone works well but durability is compromised without the hybrid material. Other teflon like coatings may also be suitable. The minimum thickness of the coating is approximately 2 to 5 mils, depending on the thickness of the heavy corrugated plastic sheet.

The blades 28, 29 are made of sections that may be assembled into arrangements of different sizes for different size workpieces 20. After the arrangement of blades 28, 29 is assembled, it is mounted to the press head 10. Press head 10 allows the blades 28, 29 to meet the sheet 20 under the influence of the piston pressing means 16 in a controlled fashion. Press head 10 is thermally insulated on the press side of the tool to avoid heat dissipating into the press, and causing a variation in temperature along the blade edges 36. The material of press head 10 is preferably thermally insulating up to a temperature in the range of 450° F. to 500° F., and withstands compressive loads under continuous use without deforming the press head. In one practice of the invention, a 0.25 in. reinforced fiberglass, commonly referred to as "g7", has been found to be a good thermal insulator with acceptable mechanical properties.

Figure 2:
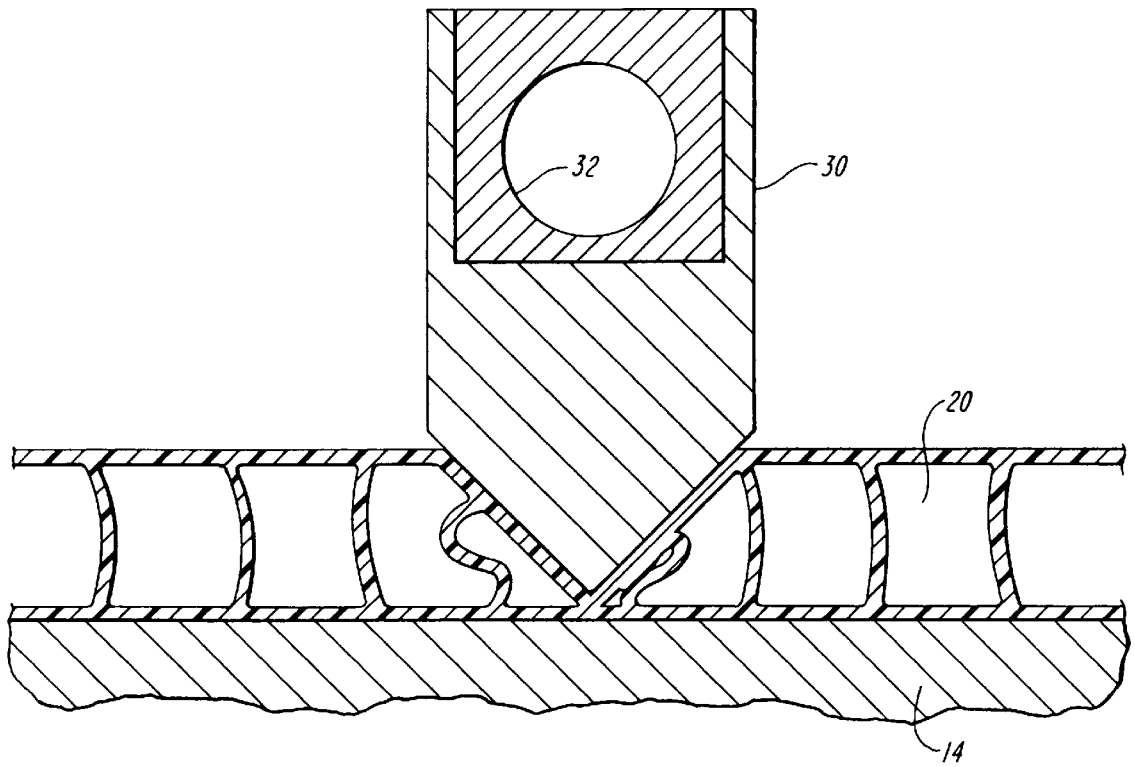
FIG. 2 is a detailed cross-sectional view of a heated blade of the press melting and compressing a heavy corrugated plastic sheet.
Figure 3:
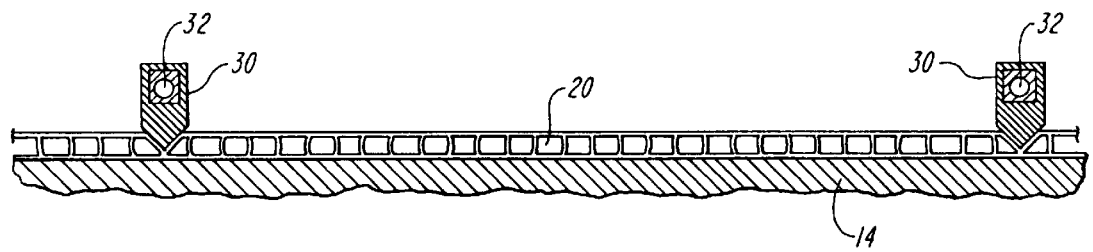
FIG. 3 is a cross-sectional view similar to that of FIG. 2 except that it shows the application of the two blades.

In one operation of the press, the heavy corrugated plastic sheet 20, already precut with the corner cuts 24, is placed in position on the surface of the press bed 14 or 15. The head 10 of the press is pressed down on the bed 14, bringing the arrangement of heated blades 28, 29 down to bear on the fold lines 22 of the plastic sheet 20. The blades 28, 29 are typically heated to a temperature of about 430° F. by their heating elements 32. As seen in FIGS. 2 and 3, the head 10 of the press is brought to bear long enough on the sheet 20 to cause melting and compressing of the sheet 20 along those fold lines 22. While the fold lines 22 are scored, heated blades 29 contact the corresponding edges 40*a, b, c,* and *d* and 42*a, b, c,* and *d* of the workpiece 20 to melt the plastic sheet, creating a tacky surface all along the edges 40*a, b, c,* and *d* and 42*a, b, c,* and *d*. Heated blades 29 preferably create an angled indention of about 45° in the surface of edges 4*a, b, c,* and *d* and 42*a, b, c,* and *d* to increase the surface area at each edge and promote better adhesion of the edges to each other when they are joined. Heated blades 29 melt the heavy corrugated plastic sheet 20 at the edges 40*a, b, c,* and *d* and 42*a, b, c,* and *d* but do not melt through both of the outer layers, insuring strength of the joint when the material cools. The press 12 exerts approximately 25 to 100 lbs. of down force per linear foot to force the corrugated material to yield internally due to the heat penetration, while avoiding compression of the material due to the external down force.

Figure 1D:
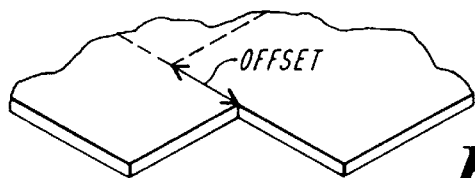
FIG. 1D is a detail view of a corner of the plastic sheet shown in FIG. 1C.

The operation of the process for creating a walled receptacle in conjunction with bed 15 in FIG. 1C is now described. The heavy corrugated plastic sheet 20, already precut with the corner cuts 24, is placed in position on the surface of the press bed 15. The heavy corrugated plastic sheet has designated fold lines 23, as shown in FIG. 1C and in FIG. 1D, that are offset by distance of about the thickness of the corrugated material when the fold lines 23 are parallel to the internal flutes of the corrugated plastic. While only one designated pair of fold lines are shown with an offset in FIG. 1C, it is recognized by those of ordinary skill in the art that both sets of fold lines can be offset The head 10 of the press is pressed down on the bed 15, bringing the arrangement of heated blades 28, 29 down to bear on the fold lines 22 and 23 of the plastic sheet 20. The blades 28, 29 are typically heated to a temperature of about 430° F. by their heating elements 32. The head 10 of the press is brought to bear long enough on the sheet 20 to cause melting and compressing of the sheet 20 along those fold lines 22 and 23. While the fold lines 22 and 23 are scored, the lower, heated blades 29 contact the corresponding edges 40*a, b, c,* and *d* and 42*a, b, c,* and *d* of the workpiece 20 to melt the plastic sheet, creating a tacky continuous surface of thermoplastic all along the edges 40*a, b, c,* and *d* and 42*a, b, c,* and *d*. Blades 29 which extend further from the press head than blades 28, are lowered completely through the cutaway edges of bed 15 so that the corner edges of workpiece 20 are fully exposed to the blades, and thus there is more thorough heating of the edges. Blades 29 are configured on press head such that the blades 29 that are to heat the corner edges that are parallel to the internal flutes of the corrugated material are positioned at a slight offset to cause a meltback of the plastic material and thus produce a greater amount of thermoplastic at the surface for edges parallel to the flutes.

This meltback of material compensates for the offset introduced into the designated fold lines 23, and eliminates it. Heated blades 29 preferably create an angled indention of about 45° in the surface of edges 40a, b, c, and d and 42a, b, c, and d to increase the surface area at each edge and promote better adhesion of the edges to each other when they are joined. Heated blades 29 melt the heavy corrugated plastic sheet 20 at the edges 40a, b, c, and d and 42a, b, c, and d but in this embodiment do melt through both of the outer layers, thus providing for a stronger join when the walls are brought together. Again, heads 10 of the press exerts approximately 25 to 100 lbs. of down force per linear foot to force the corrugated material to yield internally due to the heat penetration, while avoiding compression of the material due to the external down force.

The heating cycle in either embodiment lasts for approximately 10 to 40 seconds. A faster cycle time does not permit the heat to adequately penetrate the internal corrugated structure for heavy thermoplastics. The opposing press pieces are then separated, and the heavy corrugated plastic sheet 20 is removed from the press 12. It appears, with heavily compressed fold lines 22.

Figure 4:
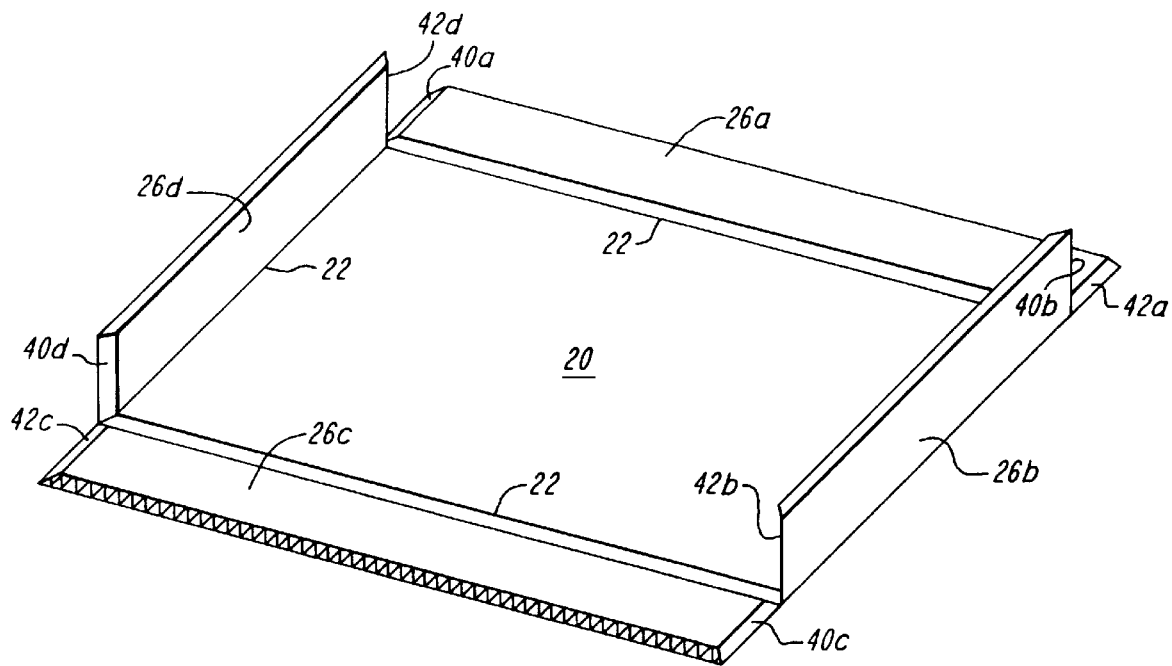
FIG. 4 is a perspective view, showing two opposing walls of the receptacle bent along the fold lines of the sheet.
Figure 5:
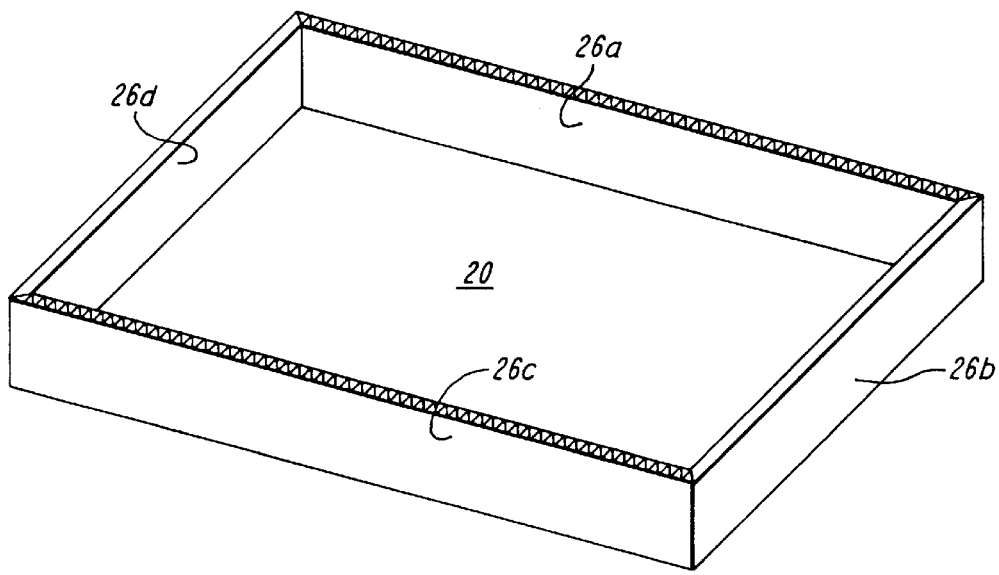
FIG. 5 is a view like FIG. 4, showing the two other walls bent along fold lines, with overlapping surfaces of the sheet portions brought into contact.

The walled receptacle to be converted from the sheet 20 is formed by folding up wall portions 26b and 26d (see FIG. 4), and joining the adjacent edges to form a corner wall as shown in FIG. 5. The edge surfaces of the edges are maintained in contact until they bond and cool.

Figure 6A:
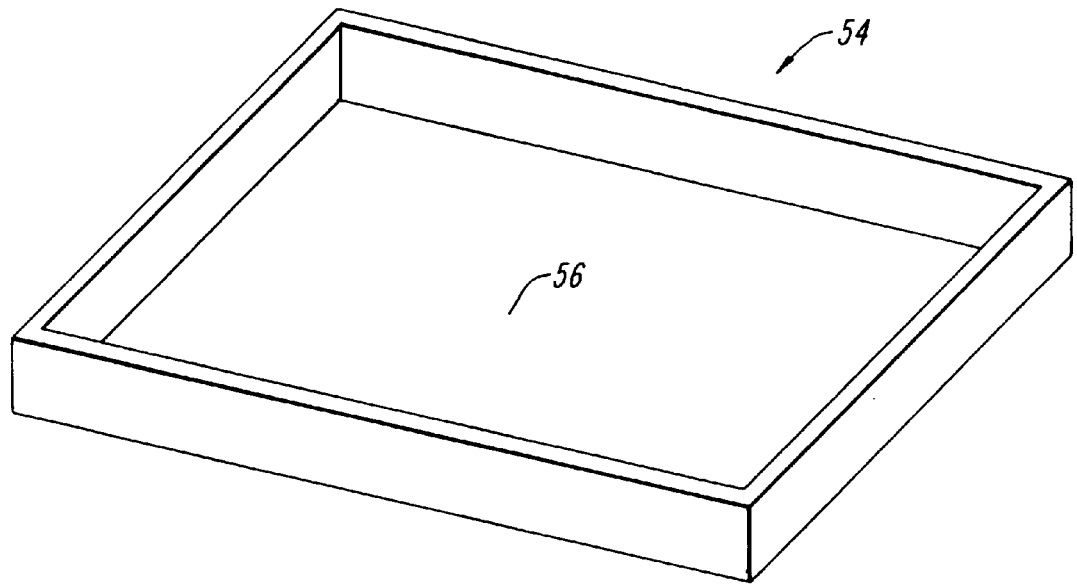
FIG. 6A is a perspective view of a frame on which the receptacle shown in FIG. 5 can be formed.
Figure 6B:
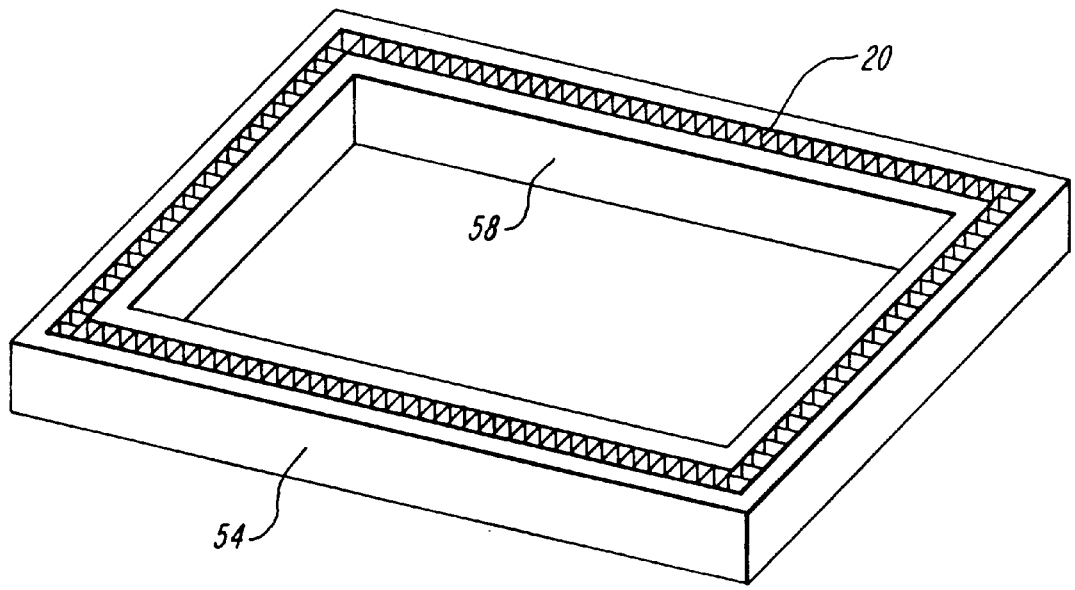
FIG. 6B is a perspective view of the workpiece positioned between the first and second jigs.

FIG. 6A shows a jig 54 that is used to construct the walled receptacle efficiently. It consists of a central rectangular main frame 56. The central frame 56 corresponds in dimensions to the fold lines 22 of the plastic sheet 20, so that the wall portions 26a, b c and d of sheet 20 are forced upright at the fold lines to create the walled receptacle when the sheet 20 is inserted into the frame 56, and the corner edges 40a, b, c, and d and 42a, b, c, and d are urged together. A second jig 58 is placed within central frame 56 to position the workpiece 20 between jigs 54 and 58, as shown in FIG. 6B. The second jig 58 reinforces the folding of the wall portions 26a, b, c, and d and promotes contact of the edge corners for sealing. The workpiece is maintained in the two jigs 54 and 58 for approximately 2 to 3 minutes, and then removed. The workpiece is further cooled for 12 to 24 hours to provide for maximum bonding.

Figure 7:
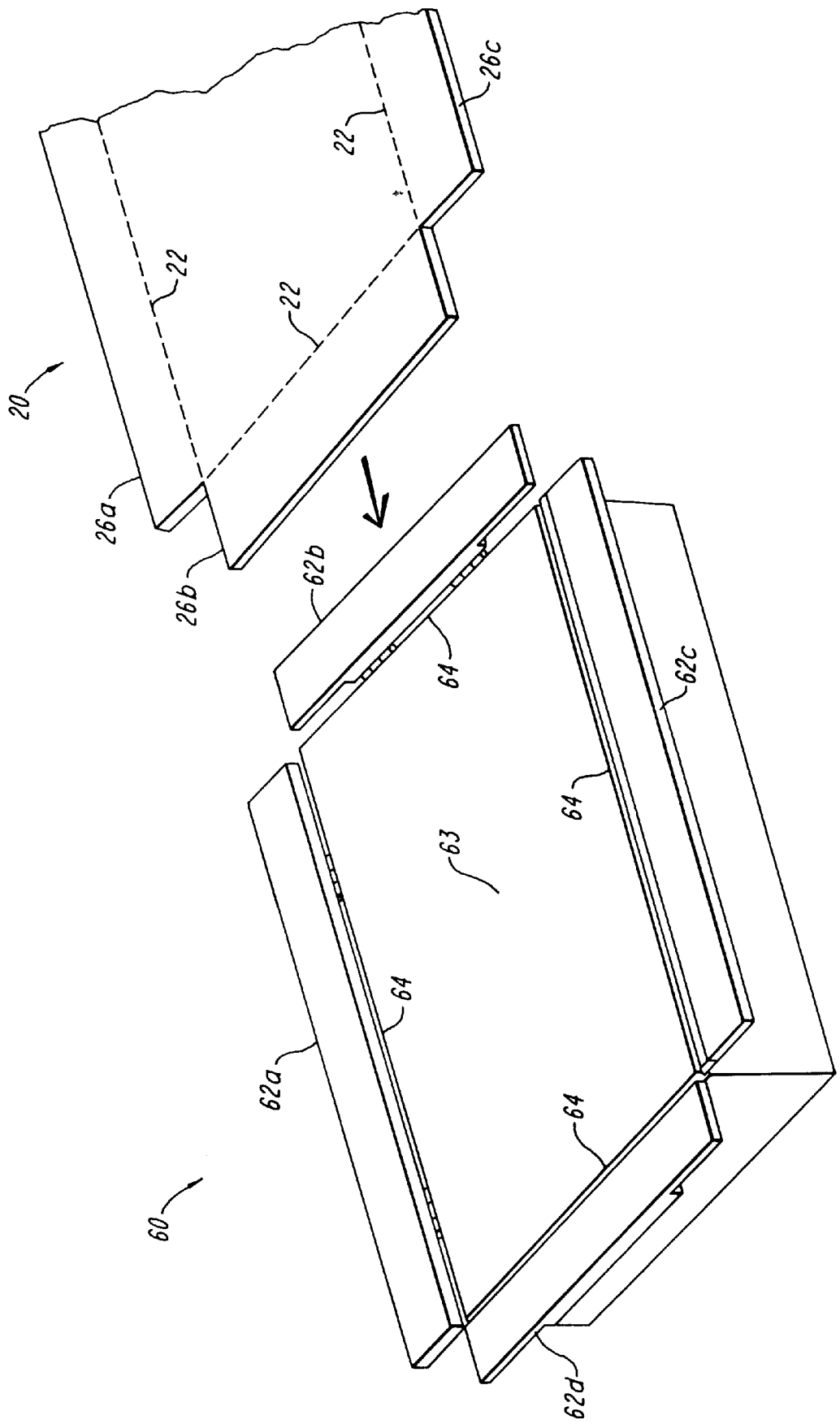
FIG. 7 is a perspective view of a workpiece to be positioned on a mechanical folding machine in accordance with the invention.

Referring now to FIG. 7, there is shown another embodiment of the invention. After having scored the fold lines 22 and heated the edges of the wall portions 26a, b, c, and d, the workpiece 20 is maintained in a flat position and moved via a conveyor belt or like to a station for mechanically folding the wall portions 26a, b, c and d into an upright position Workpiece 20 is precisely positioned on a folding machine 60 which incorporates 4 folding arms 62a, b, c, and d for folding the wall portions 26a, b, c, and d into the upright position along folds 22. The folding arms 62a, b, c, and d are hinged to a main flat surface 63, and can be mechanically rotated into the upright position Folds 22 are positioned to coincide with the fold edges 64 of the folding machine 60. The wall portions 26a, b, c, and d of workpiece 20 overlay the folding arms 64 of the folding machine 60. With the workpiece in place as described, the folding arms 64 are mechanically rotated to cause the wall portions 26a, b, c, and d to fold into the upright position, and cause the edges of the wall portion 26a, b, c, and d to contact in order to seal the corner edges of the receptacle. Again, the workpiece is maintained in this position for approximately 2 to 3 minutes and allowed to cool, before removal. In another embodiment of the invention a male jig such as jig 58 is mechanically or manually positioned along the fold lines 22 after the workpiece is positioned on the folding machine 60. When the fold arms 62a, b, c, and d are mechanically rotated into an upright position, the wall portions 26a, b, c, and d are contained between the fold arms 62a, b, c, and d and the sides of jig 58. Jig 58, again, reinforces the folding of the wall portions 26a, b, c, and d and promotes contact of the edge corners for sealing.

The apparatus shown carries out the method of constructing a walled receptacle from a heavy corrugated plastic sheet, which includes designating fold lines on the sheet, applying heated blades to melt and compress the sheet along the fold lines, while simultaneously heating the corner surface edges of the sheet that will join and seal together during construction of the receptacle, and then bending the sheet along the fold lines and contacting the heated surfaces under pressure so that they adhere after cooling.

While a preferred embodiment of the invention has been set forth, variations may occur to those skilled in the art, that are within the scope of the invention, as defined in the following claims.

What is claimed is:

1. A method for constructing a walled receptacle from a heavy corrugated plastic sheet, comprising the following steps:
   a) designating fold lines on said heavy corrugated plastic sheet,
   b) applying a first set of heatable blades mounted on a press head in a first plane to melt and compress said heavy corrugated plastic sheet along said fold lines,
   c) simultaneously heating corner surface edges of said heavy corrugated plastic sheet, that will join and seal together during construction of said walled receptacle to the point of tackiness, with a second set of heatable blades that are mounted on said press head in a plane parallel to but extending further from said press head than said first set of heatable blades, and then,
   d) bending said heavy corrugated plastic sheet along said fold lines and contacting said heated corner surface edges so that they adhere after cooling
   including, before step b, cutting corner cuts in said heavy corrugated plastic sheet, extending from the perimeter of said sheet to a fold line, whereby portions of said heavy corrugated plastic sheet adjacent said corner cuts may be bent.

2. The method of claim 1, in which said heated blades are heated to a temperature in the range of approximately 390 to 450° F.

3. The method of claim 2, in which said heated blades are heated to a temperature of approximately 430° F.

* * * * *